United States Patent
Reisswig et al.

(10) Patent No.: US 11,003,861 B2
(45) Date of Patent: May 11, 2021

(54) CONTEXTUALIZED TEXT DESCRIPTION

(71) Applicant: SAP SE, Walldorf (DE)

(72) Inventors: Christian Reisswig, Berlin (DE); Darko Velkoski, Berlin (DE); Sohyeong Kim, Berlin (DE); Hung Tu Dinh, Berlin (DE)

(73) Assignee: SAP SE, Walldorf (DE)

( * ) Notice: Subject to any disclaimer, the term of this patent is extended or adjusted under 35 U.S.C. 154(b) by 203 days.

(21) Appl. No.: 16/275,025

(22) Filed: Feb. 13, 2019

(65) Prior Publication Data
US 2020/0257764 A1 Aug. 13, 2020

(51) Int. Cl.
G06F 40/00 (2020.01)
G06F 40/30 (2020.01)
G06F 40/211 (2020.01)
G06F 40/284 (2020.01)

(52) U.S. Cl.
CPC ............ *G06F 40/30* (2020.01); *G06F 40/211* (2020.01); *G06F 40/284* (2020.01)

(58) Field of Classification Search
CPC combination set(s) only.
See application file for complete search history.

(56) References Cited

U.S. PATENT DOCUMENTS

| | | |
|---|---|---|
| 10,812,449 B1 | 10/2020 | Cholleton |
| 10,963,645 | 3/2021 | Reisswig et al. |
| 2012/0233127 A1 | 9/2012 | Solmer et al. |
| 2014/0236578 A1 | 8/2014 | Malon et al. |
| 2018/0165554 A1 | 6/2018 | Zhang et al. |
| 2019/0087728 A1 | 3/2019 | Agarwal et al. |

OTHER PUBLICATIONS

Abkik, Alan, et al., "Contextual String Embeddings for Sequence Labeling", Proceedings of the 27th International Conference on Computational Linguistics, (2018), 1638-1649.

Ackermann, Nils, "Introduction to ID Convolutional Neural Networks in Keras for Time Sequences", [Online]. Retrieved from the Internet: <URL: https://blog.goodaudience.com/introduction-to-1d-convolutional-neural-networks-in-keras-for-time-sequences-3a7ff801a2cf>, (Sep. 4, 2018), 8 pgs.

Dauphin, Yann A, et al., "Language Modeling with Gated Convolutional Networks", Proceedings of the 34 th International Conference on Machine Learning. arXiv: 1612.08083v3, (2017), 9 pgs.

(Continued)

*Primary Examiner* — Vu B Hang
(74) *Attorney, Agent, or Firm* — Schwegman Lundberg & Woessner, P.A.

(57) ABSTRACT

Various examples are directed to systems and methods for classifying text. A computing device may access, from a database, an input sample comprising a first set of ordered words. The computing device may generate a first language model feature vector for the input sample using a word level language model and a second language model feature vector for the input sample using a partial word level language model. The computing device may generate a descriptor of the input sample using a target model, the input sample, the first language model feature vector, and the second language model feature vector and write the descriptor of the input sample to the database.

20 Claims, 10 Drawing Sheets

(56) References Cited

OTHER PUBLICATIONS

Devlin, Jacob, et al., "BERT: Pre-training of Deep Bidirectional Transformers for Language Understanding", Google. arXiv:1810. 04805v1, [Online]. Retrieved from the Internet: <URL: https://arxiv.org/abs/1810.04805>, (2018), 14 pgs.
Merity, Stephen, et al., "An Analysis of Neural Language Modeling at Multiple Scales", arXiv:1803.08240v1, (2018), 10 pgs.
Peters, Matthew, et al., "Deep contextualized word representations", Proceedings of NAACL-HLT, (2018), 2227-2237.
Radford, Alec, et al., "Improving Language Understanding Generative Pre-Training", (2018), 12 pgs.
"European Application Serial No. 19206110.9, Extended European Search Report dated May 14, 2020", 8 pgs.
Bojanowski, Piotr, et al., "Enriching Word Vectors with Subword Information", ArXiv: 1607.04606v1, (Jul. 15, 2016), 7 pgs.
Botha, Jan, et al., "Composition Morphology for Word Representations and Language Modelling", Proceedings of the 31st International Conference on Machine Learning, (2014), 9 pgs.
Miyamoto, Yasumasa, et al., "Gated Word-Character Recurrent Language Model", arXiv:1606.01700v1, (Jun. 6, 2016), 5 pgs.
Wang, Zhilin, et al., "Words of Characters? Fine-grained Gating for Reading Comprehension", arXiv:1611.01724v1, (Nov. 6, 2016), 10 pgs.
"U.S. Appl. No. 16/270,328, Amendment filed Feb. 22, 2021", 7 pgs.
"U.S. Appl. No. 16/270,328, Notice of Allowance dated Jan. 25, 2021", 9 pgs.
"U.S. Appl. No. 16/270,328, Response dated Feb. 26, 2021 to 312 Amendment filed Feb. 22, 2021", 2 pgs.
Bao, Zuyi, et al., "Neural domain adaptation with contextualized character embedding for Chinese word segmentation", National CCF Conference on Natural Language Processing and Chinese Computing. Springer, Cham, (2017).

CONTEXTUALIZED TEXT DESCRIPTION

TECHNICAL FIELD

This document generally relates to methods and systems for use with computer devices, including networked computing devices. More particularly, this document relates to systems and methods for generating descriptors of text samples.

BACKGROUND

Natural language processing is an important way for human users to interface with computing devices. Traditionally, computing devices have been configured to receive input from human users in specialized formats and syntaxes. Natural language processing allows computing devices to understand words arranged according to the syntax of human languages. The nuances of human language, however, make natural language processing a technically challenging proposition.

BRIEF DESCRIPTION OF DRAWINGS

The present disclosure is illustrated by way of example, and not limitation, in the following figures.

DETAILED DESCRIPTION

Figure 1:
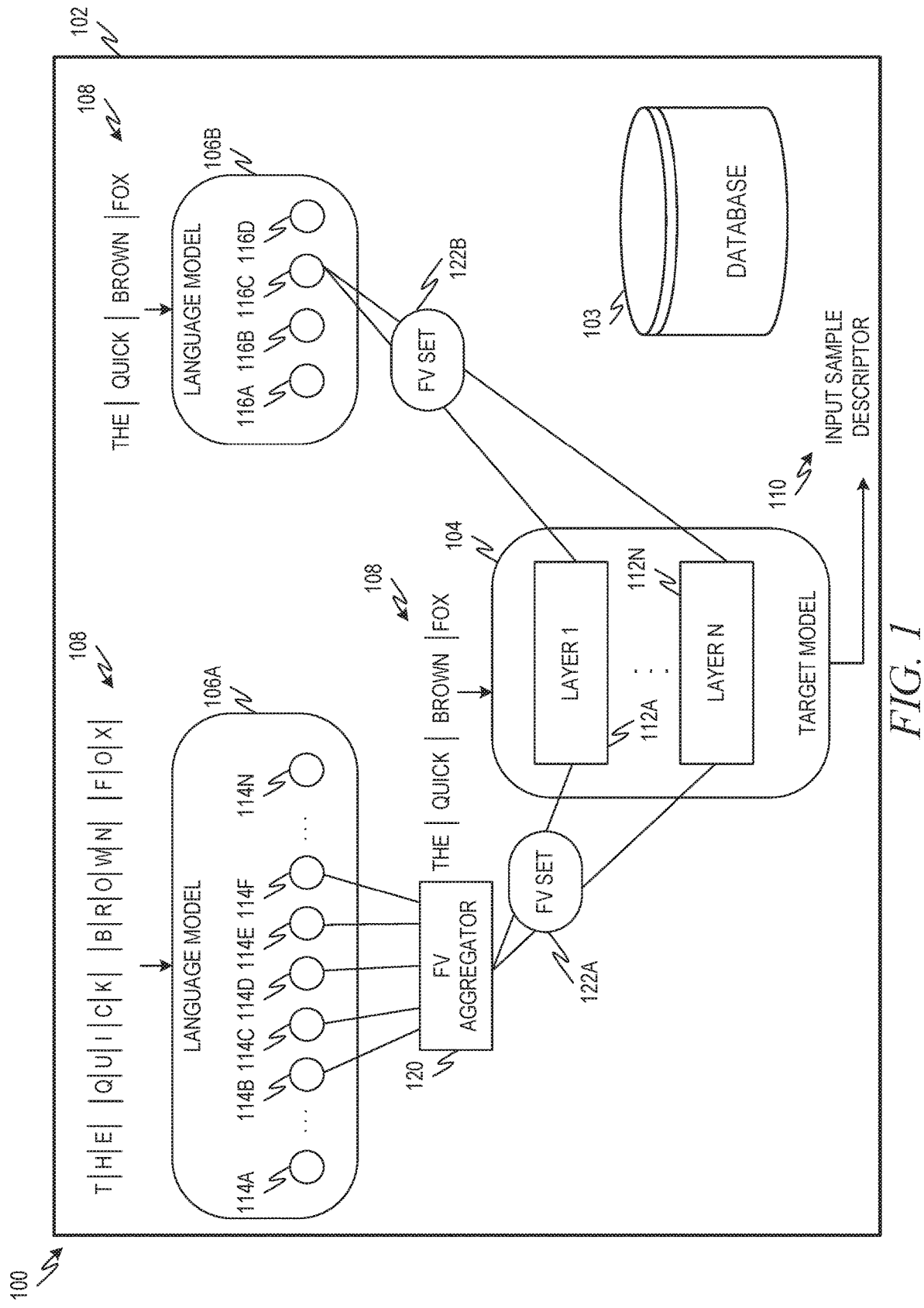
FIG. 1 is a diagram showing one example of an environment for performing natural language processing tasks.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to improving natural language processing using a target model and multiple language models, with the different language models operating at different levels (e.g., word level, sub-word level, and/or character level). Natural language processing tasks, such as key-value extraction, summarization, sentiment analysis, etc., include using a computing device to determine the meaning of a word or words arranged according to a human language.

Natural language processing tasks operate on input samples that include an ordered set of words. A word can be a selection of characters separated by spaces. Consider the following sample:

Sample 1:

"She made a deposit to her bank account."

Sample 1 includes the words "she" "made" and so. Each word includes one or more characters separated by a space. For example, the word "made" includes a set of characters that are separated from the previous word in the sample (She) and the next word in the sample (a) by spaces.

In human language, the meaning of a word or words often depends on the context in which the word is used. Consider the following sample in conjunction with Sample 1 above:

Sample 2:

"He sat down on the bank of the stream."

Both Samples 1 and 2 include an ordered set of words. The word "bank" has different meanings in Samples 1 and 2. In Sample 1, the word "bank" refers to a financial institution. In Sample 2, the word "bank" refers to an area of land near a river or lake. The difference in meanings is discernable from the other words in the sample. In the example of Samples 1 and 2, each word includes alphabetic characters only, although in other examples strings can include numeric and/or other characters in addition to or instead of alphabetical characters.

When performing a natural language processing task, a computing device can account for the context of a word by using a target model in conjunction with a language model. The target model is used to execute a natural language processing task on an input sample that includes an ordered set of words, such as the example Samples 1 and 2 above. The words can include letters, numbers, symbols, etc. The language model is another model that is used generate one or more feature vectors based on input sample. The feature vector or vectors are indicative of the context of the input sample. The target model is used to perform the natural language processing task based on the input sample and on the one or more feature vectors.

In some examples, the language model is or includes a neural network or other layered model. For example, the language model may be implemented with a number of layers. Each layer can include a set of nodes. An input sample is provided to the nodes of a first layer, which generate first layer outputs. The nodes of subsequent layers receive inputs from the nodes of the previous layer and provide outputs to the nodes of the next layer (if any). The output of the language model is given by the outputs of the nodes at the last layer. The outputs of a given layer form a feature vector. For example, the outputs of the nodes at a first layer can form a first feature vector. The outputs of the nodes at a second layer can form a second feature vector, and so on. These feature vectors can be provided as inputs to the target model, as described herein.

In some example embodiments, a language model is implemented as an autoencoder. An autoencoder language model is trained to reconstruct an input sample. For example, an autoencoder language model can be trained to predict the value of a subject word included in an input sample based on other words or characters in the input sample. For example, referring to Sample 1 above, an autoencoder language model can be programmed to return the word "bank" when provided with an input sample that includes the other words of Sample 1 in the indicated order.

Models, including target models and language models, can operate at different levels where the level of a model describes a portion of a sample indicated by the model output. For example, a model may be a word level model, a sub-word level model or a character-level model. A word level model provides an output describing a word from the input sample. For example, a word level language model receiving Sample 1 above may be programmed to return the word "bank" (or another word from Sample 1) when provided with some or all of the other parts of Sample 1. A word level target model receiving Sample 1 above may be programmed to return a descriptor of the word "bank" (or another word from Sample 1) when provided with some or all of the other parts of Sample 1.

Partial word level models provide outputs describing partial words (e.g., less than all of a word). One type of partial word level model is a character level model. A character level model provides an output describing a character from the input sample. For example, a character level language model receiving Sample 1 may be programmed to return the character "b" from the word "bank" when provided with some or all of the other characters of Sample 1. A character level target model receiving Sample 1 may be programmed to return a descriptor of the letter "b" based on some or all of the other characters of Sample 1. Another type of partial word level model is a sub-word level model. A sub-word level model provides an output describing a sub-word, (e.g., a partial word that includes more than one character). For example, a sub-word level language model receiving Sample 1 may be programmed to return the sub-word "ban" considering other sub-words of Sample 1. A sub-word level target model receiving Sample 1 may be programmed to return a descriptor of the sub-word "ban" considering other sub-words of Sample 1.

In many model systems the language model and target model are implemented at the same level (e.g., word level, sub-word level, or character level). This may simplify the operation of the system because feature vectors generated using the language model describe the same level used by the target model. For example, a word level language model generates word level feature vectors that can be provided to the various layers of a word level target model.

In some examples, however, it may be advantageous for a model system to include multiple language models operating at different levels (e.g., a word level and a partial word level). For example, feature vectors generated by language models at different levels may provide different contextual data. Considering contextual data from different language models and different levels may increase the accuracy of the target model.

Utilizing language models implemented at a different level than the target model, however, creates technical challenges. For example, feature vectors generated by a language model at one level (e.g., word level, sub-word level, character level) may not directly relate to a target model at another level. Accordingly, some examples described herein are directed to model systems in which feature vectors from language models at one level are used with target models at another level.

In some examples, a lower level language model is used with a higher level target model. For example, a character level language model is at a lower level than a sub-word level language model and at a lower level than a word level language model. A sub-word level language model is at a higher level than a character level language model and at a lower level than a word level language model.

When a lower level language model is used with a higher level target model, the lower level language model produces more than one set of feature vectors for the unit considered by the target model. Consider an example in which a character level language model is used with a word level target model to consider Sample 1 above. In this example, the target model generates a descriptor of the word "bank." Because the language operates at the character level, however, it may not generate a single set of feature vectors describing the word "bank." Instead, because it operates on individual characters, the character level language model may generate one set of feature vectors for the character "b," another set of feature vectors for the character "a," and so on.

A model system is configured to aggregate the feature vectors of the lower level language model to generate higher level feature vectors for a target model. In some examples, the model system averages lower level feature vectors to generate a set of higher level feature vectors. Referring back to the example above, the feature vector set for the character "b" could be averaged with feature vector sets for the other characters for the word to generate a word level feature vector. In another example, the model system is configured to select one set of lower level feature vectors to use as input to the higher level target model. Referring again to the example above, the model system may select the feature vector set for one of the characters of the word "bank" to use as input to the target model.

In some examples, the feature vector set is selected based on the direction of the language model. For example, a forward language model (e.g., a model that considers context prior to a subject word, sub-word, or character) may use the feature vector set corresponding to the last component (e.g., last character, last sub-word) of the unit considered by the target model. A backwards language model (e.g., a model that considers context after a subject word, sub-word, or character) may use the feature vector set corresponding to the first component (e.g., first character, first sub-word) of the unit considered by the target model.

In some examples, a model system uses an attention mechanism to select a best lower level feature vector set generated by the lower level language model. An attention mechanism is a trained sub-model that selects a lower level feature vector from a set of lower level feature vectors. The attention mechanism can be trained to select a lower level feature vector, for example, during training of the target model to maximize the performance of the target model.

In some examples, a higher level language model is used with a lower level target model. When a higher level language model is used with a lower level target model, the higher level language level produces less than one set of feature vectors for the unit considered by the target model. Consider an example in which a word level language model is used with a character level target model to consider Sample 1 above. In this example, the target model generates a descriptor of the letter "b" from the word "bank." Because the language model operates at the word level, however, it generates a set of feature vectors for the word "bank," but no feature vector specifically for the character "b."

A model system may be configured to derive lower level feature vectors for a target model from higher level feature vectors generated by a language model. In some examples, the model system uses the set of higher level feature vectors for each lower level unit. For example, returning to the "bank" example, if a word level language model generates a set of word level feature vectors for the word "bank," that word level feature vector may be used by a character level target model to generate descriptors for each character of the word "bank." In another example, the model system is configured to include a separate sub-network that is trained to extract sets of lower level feature vectors from one set of higher level feature vectors.

Also, some model systems described herein can utilize language models having forward and backwards layers. A forward layer is trained to consider context occurring in a sample before a considered unit. A backwards layer is trained to consider context occurring in a sample after a considered unit. A language model having forward and backwards layers may generate multiple sets of feature vectors for each considered unit (e.g., word, sub-word, character). In these examples, the two sets of feature vectors can be combined in various suitable ways including, for example, additional, concatenation, and/or other linear combinations.

FIG. 1 is a diagram showing one example of an environment 100 for performing natural language processing tasks. The environment 100 includes a computing device 102. The computing device 102 can be or include any suitable type of computing device or network of devices including, for example, a desktop computer, a laptop computer, a tablet or other computing device, a server, etc. Example hardware and software architectures for implementing the computing device 102 are provided herein, for example, at FIGS. 9 and 10. In the example of FIG. 1, the computing device 102 includes or is in communication with a database 103. The database 103 may include one or more tables for storing input samples 108 and/or input sample descriptors, as described herein.

The computing device 102 executes a target model 104 and language models 106A, 106B. The language models 106A, 106B include a character level language model 106A and a word level language model 106B. The language models 106A, 106B may be or include autoencoder language models. The language models 106A, 106B and target model 104 receive an input sample 108 that may be retrieved from the database 101 in the example of FIG. 1, the input sample is "the quick brown fox."

To consider the input sample 108, the character level language model 106A executes instances 114A, 114B, 114C, 114D, 114E, 114F, 114N for each character of the input sample 108. For example, one instance 114A is executed for the character "t" and so on. The number of instances 114A, 114B, 1140, 114D, 114E, 114F, 114N of the language model 1064 executed for different input samples can differ, for example, based on the number of characters in the input sample. Each instance 114A, 114B, 114C, 114D, 114E, 114F, 114N may have one or more layers including any suitable number of nodes. Layers of an instance 114A, 114B, 114C, 114D, 114E, 114F, 114N produce an output that is provided to the next layer. The outputs of the layers can be used as feature vectors. For example, an instance 114A, 114B, 114C, 114D, 114E, 114F, 114N with one layer produces a set of feature vectors including a single feature vector. An instance 114A, 114B, 114C, 114D, 114E, 114F, 114N with multiple layers produces a set of feature vectors including, for example, one feature vector for each layer.

The word level language model 106B considers the input sample 108 by executing instances 116A, 116B, 116C, 116D for each word of the input sample 108. In this example, a first instance 116A corresponds to the word "the," the second instance 116B corresponds to the word "quick" and so on. The number of instances 116A, 116B, 116C, 116D of the language model 106B executed for different input samples can differ, for example, based on the number of words in the input sample.

The target model 104 is trained to perform a natural language processing task. Natural language processing tasks include tasks that determine the meaning of a word or group of words. One type of natural language processing task is key-value extraction. Key-value extraction involves detecting one or more words in a sample that are of a particular type, indicated by a key. Consider an example key for "first names." Key-value extraction includes identifying words from one or more samples that are first names. Consider another example key for "invoiced amount." Key-value extraction includes identifying words from one or more samples, such as invoices or other business documents, that indicate an invoiced amount.

Another example natural language processing task is summarization. Summarization includes determining important information from a sample and generating an abridged version of the sample. Yet another example natural language processing task is sentiment analysis. Sentiment analysis includes analyzing a sample and determining the author's attitude or emotion as a whole and/or the author's attitude or emotion towards a particular topic or topics described by the sample.

In the example of FIG. 1, the target model 104 is a word level model. The target model 104 can include multiple layers 112A, 112B where each layer 112A, 112B includes one or more nodes. Nodes at a given layer 112A, 112B can receive as input either the input sample 108 and/or an output of a previous layer. For example, here the first layer 112A receives as input the input sample 108. The Nth layer 112N receives as input the output of the N–1 layer. The target model 104 generates an input sample descriptor 110 that describes a considered unit of the input sample 108. As here, where the target model 104 is a word level model, the considered unit is a word. For example, the input sample descriptor 110 can indicate the results of a natural language processing task with respect to the considered word, such as a key value, etc.

In the example of FIG. 1, the considered unit for the target model 104 is the word "brown" from the input sample 108: "The quick brown fox." The word level language model 106B provides a set of feature vectors 122B from instance 116C executed for the word "brown." The set of feature vectors 122B can be provided to each layer 112A, 112N of the target model 104. The character level language model 106A generates sets of feature vectors from the instances 114B, 114C, 114D, 114E, 114F corresponding to the characters "b" "r" "o" "w" and "n" of the word "brown." These sets of feature vectors are provided to a feature vector aggregator 120 that generates a single set of feature vectors 122A that is provided to the layers 112A, 112N of the target model 104. The target model 104 generates the input sample descriptor 110 based on the input sample 108 and the sets of feature vectors from the language models 106A, 106B.

The feature vector aggregator 120 can generate the set of feature vectors 122A from the sets of feature vectors generated by the instances 114B, 114C, 114D, 114E, 114F. In some examples, the feature vector aggregator 120 selects a set of feature vectors from one of the instances 114B, 114C, 114D, 114E, 114F. For example, when the language model 106A is a forward model, the feature vector aggregator 120 can select as the set of feature vectors 122A the set of feature vectors from the instance 114F corresponding to the character "n." In this way, the selected set of feature vectors 122A can consider context from all of the preceding words in the input sample 108 and the preceding characters of the considered word "brown." Similarly, when the language model 106A is a backwards model, the feature vector aggregator 120 can select as the set of feature vectors 122A the set of feature vectors from the instance 114B corresponding to the character "b." In this way the selected set of feature vectors 122A can consider context from all of the succeeding words in the input sample 108 and the succeeding characters of the considered word "brown."

In another example, the feature vector aggregator 120 generates a set of feature vectors 122A that is an average of the sets of feature vectors generated by the instances 114B, 114C, 114D, 114E, 114F. Consider an example in which the character level language model 106A includes two layers. Accordingly, each instance 114B, 114C, 114D, 114E, 114F will generate a set of feature vectors including a first layer feature vector and a second layer feature vector. The set of feature vectors 122A may include a first layer feature vector that is an average of all of the first layer feature vectors of the instances 114B, 114C, 114D, 114E, 114F and a second layer feature vector that is an average of all of the second layer feature vectors of the instances 114B, 114C, 114D, 114E, 114F.

In another example, the feature vector aggregator 120 implements an attention mechanism. The attention mechanism is tuned to select a set of feature vectors generated by one or more of the instances 114B, 114C, 114D, 114E, 114F that is best suited for the target model 104. In some examples, the attention mechanism generates a linear combination of all of the feature vectors 114B, 114C, 114D, 114E, 114E within a word or sub-word. Coefficients for the linear combination can be learned, for example, using an extra hidden layer and an attention mechanism context vector. The attention mechanism context vector may be trained to indicate which instance 114B, 114C, 114D, 114E, 114F is most informative for a given word or sub-word. For example, the feature vectors may be transformed into hidden representations by the extra hidden layer. Then, the attention mechanism context vector may be compared to all of the hidden representations and similarity scores may be produced for each character. Normalized weights and/or coefficients for the linear combination may be determined by applying a softmax function to the resulting scores. The extra hidden layer and the attention mechanism context vector may be trained with the remainder of the target model, as described herein.

Figure 2:
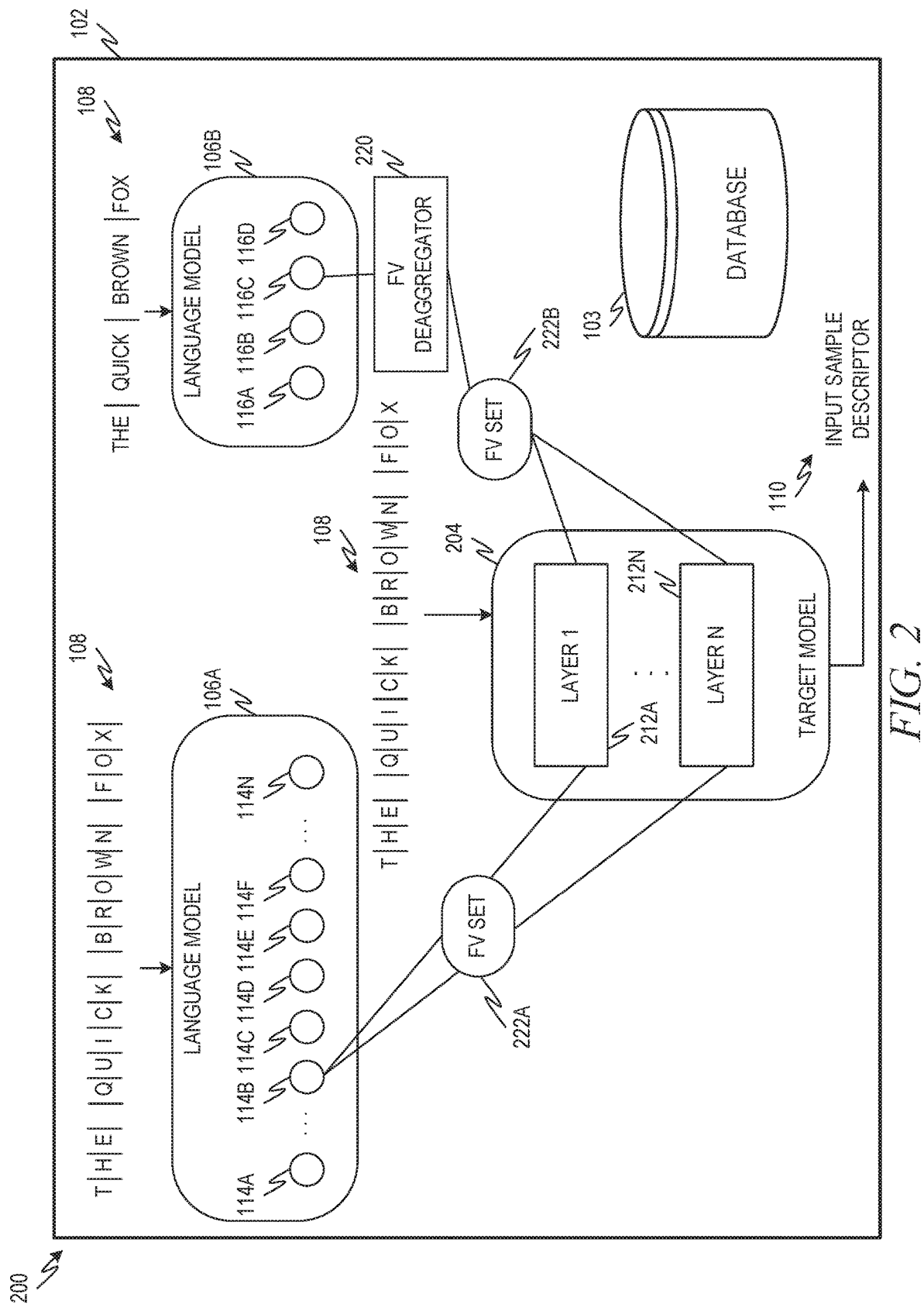
FIG. 2 is a diagram showing another example of an environment for performing natural language processing tasks.

Although the feature vector aggregator 120 is this example converts sets of feature vectors from a character level language model 106A for use by a word level language model 104, the techniques of the feature vector aggregator 120 can be used to covert sets of feature vectors from a lower level language model for use at a higher level target model. For example, the feature vector aggregator 120 could also be used to generate a single set of feature vectors from multiple sets of feature vectors generated by a sub-word level language model, FIG. 2 is a diagram showing another example of an environment 200 for performing natural language processing tasks. The environment 200 of FIG. 2 is similar to the environment 100 of FIG. 1 but includes a character level target model 204 having layers 212A, 212N. The considered unit for the target model 204, then is a character. In this example, the considered unit is the character "b" from the word "brown." The target model 204 receives a set of feature vectors 222A from the instance 114a of the character level language model 106A that considers the character "b."

In this example, the word level language model 106B generates one set of feature vectors (e.g., by the instance 116C) that correspond to the word "brown" but do not specifically correspond to the considered character "b." A feature vector deaggregator 220 is provided to generate the feature vector set 222B provided to the target model 204 by the word level language model 106B. The feature vector deaggregator 220 can select the feature vector set 222B in any suitable manner. In some examples, the feature vector deaggregator 220 can re-use a word level set of feature vectors for each character in the letter. In the example of FIG. 2, this means that the feature vector deaggregator 220 would pass the set of feature vectors generated by the instance 116C while the target model 204 considers the character "b" (and other letters of the word "brown"). In other examples, the feature vector deaggregator 220 can upsample the set of feature vectors 222B to correspond to the considered character of the target model 204, for example, utilizing a trained network.

Upsampling can be performed, for example, using a sub-network including one or more layers of successive transposed one-dimensional convolutions, such as fractionally strided convolutions. The convolutions may interpolate or upsample from the lower level resolution (e.g., word level or sub-word level) to a higher level of resolution, (e.g., sub-word level or character level). In some examples, to obey forward/backwards character target resolutions, the convolutions are off-centered by, for example, shifting the output or by masking those elements of the convolution kernel that read values from the future or the past. This may prevent the sub-network from using information from the future, in case of a forward model, or from the past, in case of a backwards mode. The sub-network, in some examples, is trained jointly with the language models.

Figure 3:
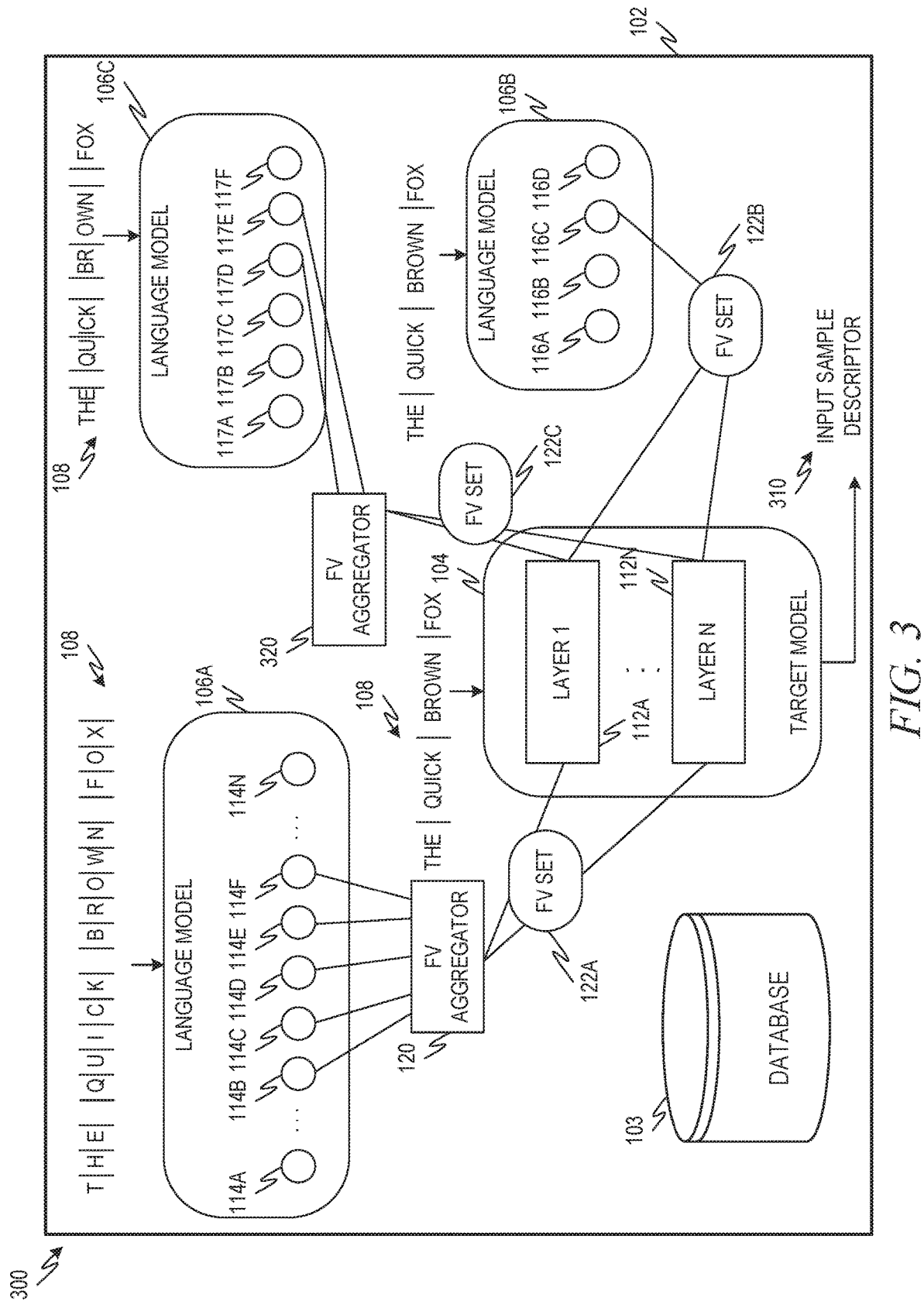
FIG. 3 is a diagram showing yet another example of an environment for performing natural language processing tasks.

FIG. 3 is a diagram showing yet another example of an environment 300 for performing natural language processing tasks. The environment 300 of FIG. 3 may be similar to the environment 100 of FIG. 1 with the addition of a sub-word level language model 106C that also receives the input sample 108. To consider the input sample 108, the sub-word level language model 106C may divide the input sample 108 into sub-words. Sub-words can be determined in any suitable manner. In this example, the input sample "the quick brown fox" is divided into sub words "the" "qu" "ick" "br" "own" and "fox." The sub-word level language model 106C executes instances 117A, 117B, 117C, 117D, 117E, 117E for each sub-word of the input sample 108. For example, one instance 117A is executed for the sub-word "the;" one instance 117B is executed for the sub-word "qu" and so on. The number of instances 117A, 117B, 117C, 117D, 117E, 117F of the language model 106C executed for different input samples can differ, for example, based on the number of characters in the input sample. Each instance 117A, 117B, 117C, 117D, 117E, 117F may produce a set of feature vectors, as described herein.

In the example of FIG. 3, the word level target model 104 is used, similar to FIG. 1. Accordingly, a feature vector aggregator 320 is used generate a feature vector set 122C for use at the word level model 104 from multiple sub-word level feature vectors generated by instances 117A, 117B, 117C, 117D, 117E, 117F. In the example of FIG. 3, the considered unit of the target model 104 is the word "brown"

as in FIG. 1. Accordingly, the feature vector aggregator 320 may generate the feature vector set 122C from feature vector sets generated by the instances of the 117D, 117E of the language model 106C that consider the sub-words "br" and "own" that make up the considered word "brown."

The feature vector aggregator 320 may operate in a manner similar to that of the feature vector generator 120. For example, when the language model 106C is a forward model, the feature vector aggregator 320 can select as the set of feature vectors 122C the set of feature vectors from the instance 117E corresponding to the sub-word "own." In this way, the selected set of feature vectors 122C can consider context from all of the preceding words in the input sample 108 and the preceding sub-words characters of the considered word "brown." Similarly, when the language model 106C is a backwards model, the feature vector aggregator 320 can select as the set of feature vectors 122C the set of feature vectors from the instance 117D corresponding to the sub-word "br." In this way the selected set of feature vectors 122C can consider context from all of the succeeding words in the input sample 108 and the succeeding sub-words of the considered word "brown." In another example, the feature vector aggregator 320 generates a set of feature vectors 122C that is an average of the sets of feature vectors generated by the instances 117D, 117E.

In the example of FIG. 3, the target model 104 is a word level model. In some examples, however, the target model in the arrangement of FIG. 3 may be a sub-word level model or a character level model. In examples where the target model is a sub-word level model, a feature vector deaggregator, similar to the deaggregator 220, may be used to generate the feature vector set 122B of the language model 106B. The feature vector aggregator 320 may be omitted. In examples where the target mode is a character level mode, the feature vector aggregator 120 may be omitted. The word level language model 106B and the sub-word level language model 106 may utilize feature vector deaggregators, such as the feature vector deaggregator 220 described herein.

Figure 4:
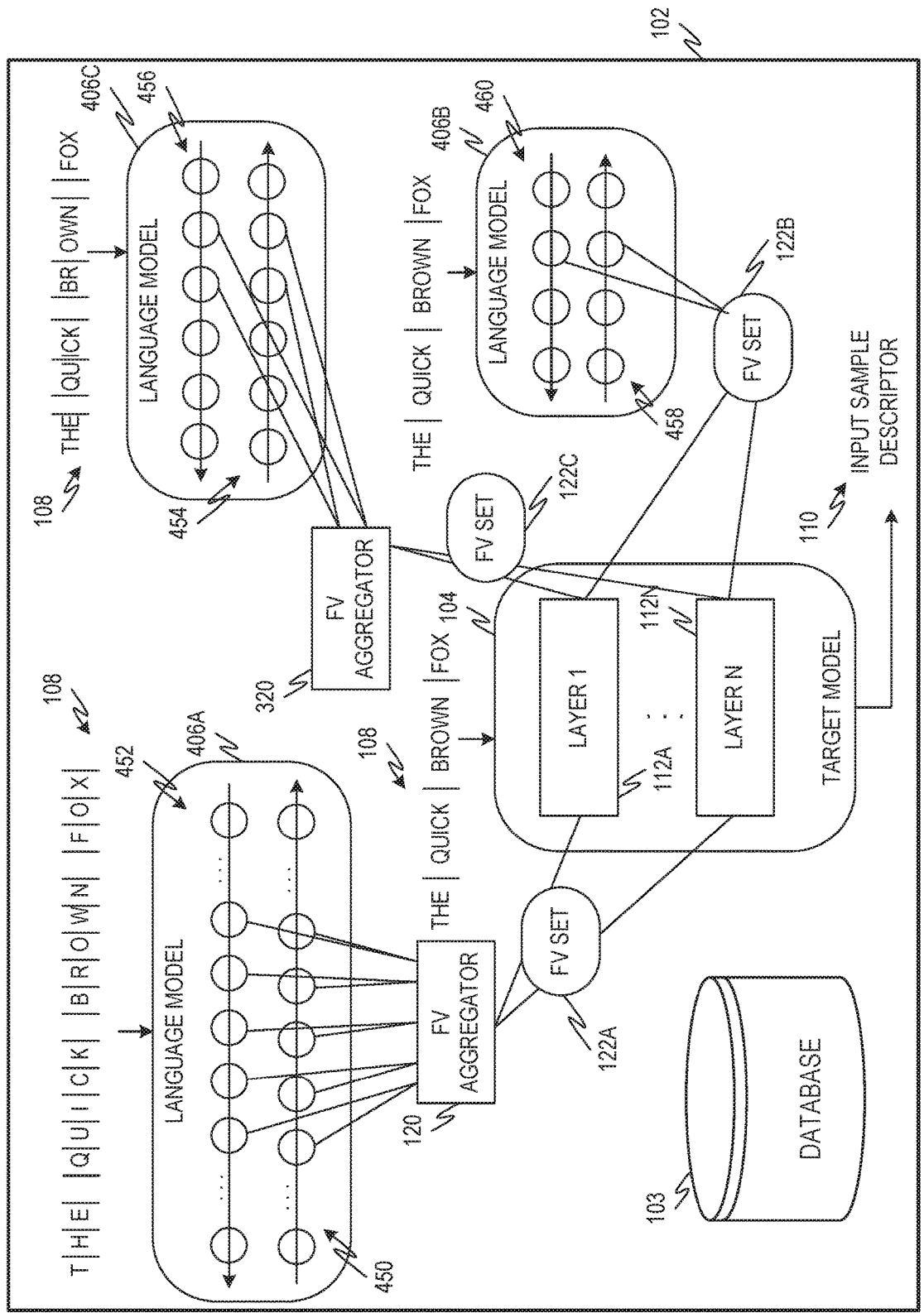
FIG. 4 is a diagram showing yet another example of an environment for performing nature language processing tasks.

FIG. 4 is a diagram showing yet another example of an environment 400 for performing nature language processing task. In the example of FIG. 4, language models 406A, 406B, 406C execute forward layers 450, 454, 458 and backwards layers 452, 456, 460. For example, the character level language model 406A includes forward layer 450 and backwards layer 452. Word level language model 406B includes a forward layer 458 and a backwards layer 460. Sub-word level language model 406C includes a forward layer 454 and a backwards layer 456. The forward layers 450, 454, 458 may include instances of the respective models 406A, 406B, 406C that consider context prior to the considered unit. The backwards layers 452, 456, 460 may include instances of the respective models 406A, 406B, 406C that consider context after the considered unit. Accordingly, each unit of the input sample 108 may be considered at the language models by a forward instance and a backwards instance. The feature vectors from forwards and backwards instances may be combined, for example, by concatenating the feature vectors, adding the feature vectors, using a trainable linear combination, or by another suitable method. The combined feature vectors from corresponding forward and reverse instances may be used to generate the feature vector sets 122A, 122B, 122C as described herein. Although FIG. 4 shows an arrangement similar to FIG. 3 with forward and reverse layers to the language models, it will be appreciated that forward and reverse language model layers may be used in any of the arrangements described with respect to FIGS. 1 and 2 as well.

Figure 5:
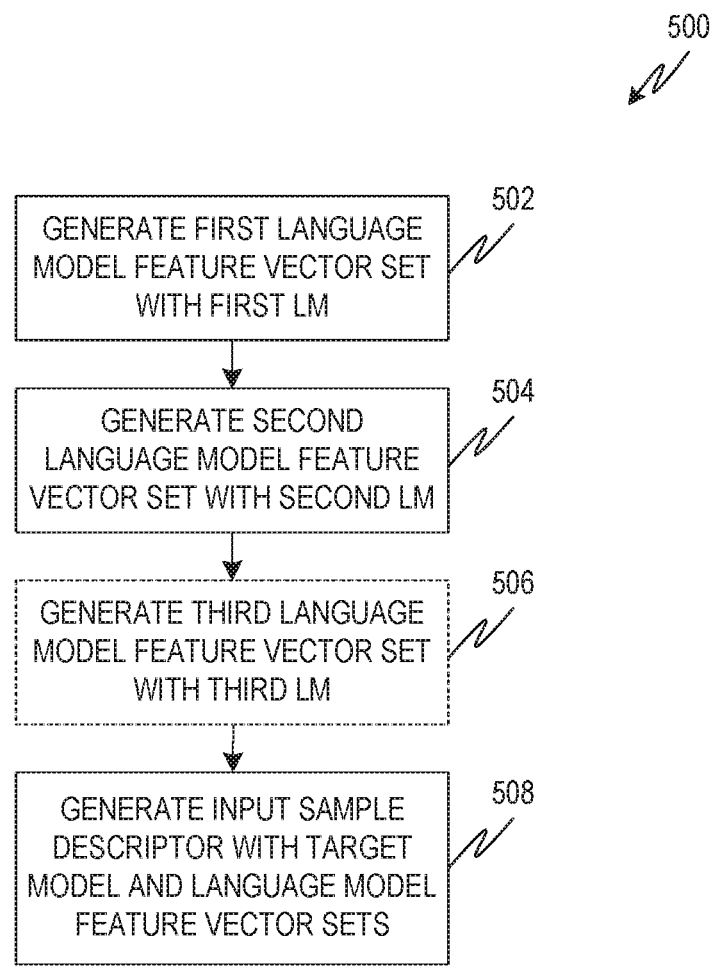
FIG. 5 is a flowchart showing one example of a process flow that may be executed by a computing device to perform a natural language processing task.

FIG. 5 is a flowchart showing one example of a process flow 500 that may be executed by a computing device, such as the computing device 102 to perform a natural language processing task. At operation 502, the computing device generates a first set of feature vectors with a first language model. As described herein, the first set of feature vectors can include one or more feature vectors. At operation 504, the computing device generates a second set of feature vectors with a second language model. The second language model, in some examples, is at a different level than the first language model. The second set of feature vectors can include one or more feature vectors. At optional operation 506, the computing device generates a third set of feature vectors with a third language model. The third language model can be at a different level than the first language model or the second language model. The third set of feature vectors can include one or more feature vectors. At operation 508, the computing device generates an input sample descriptor using a target model and the sets of feature vectors.

Figure 6:
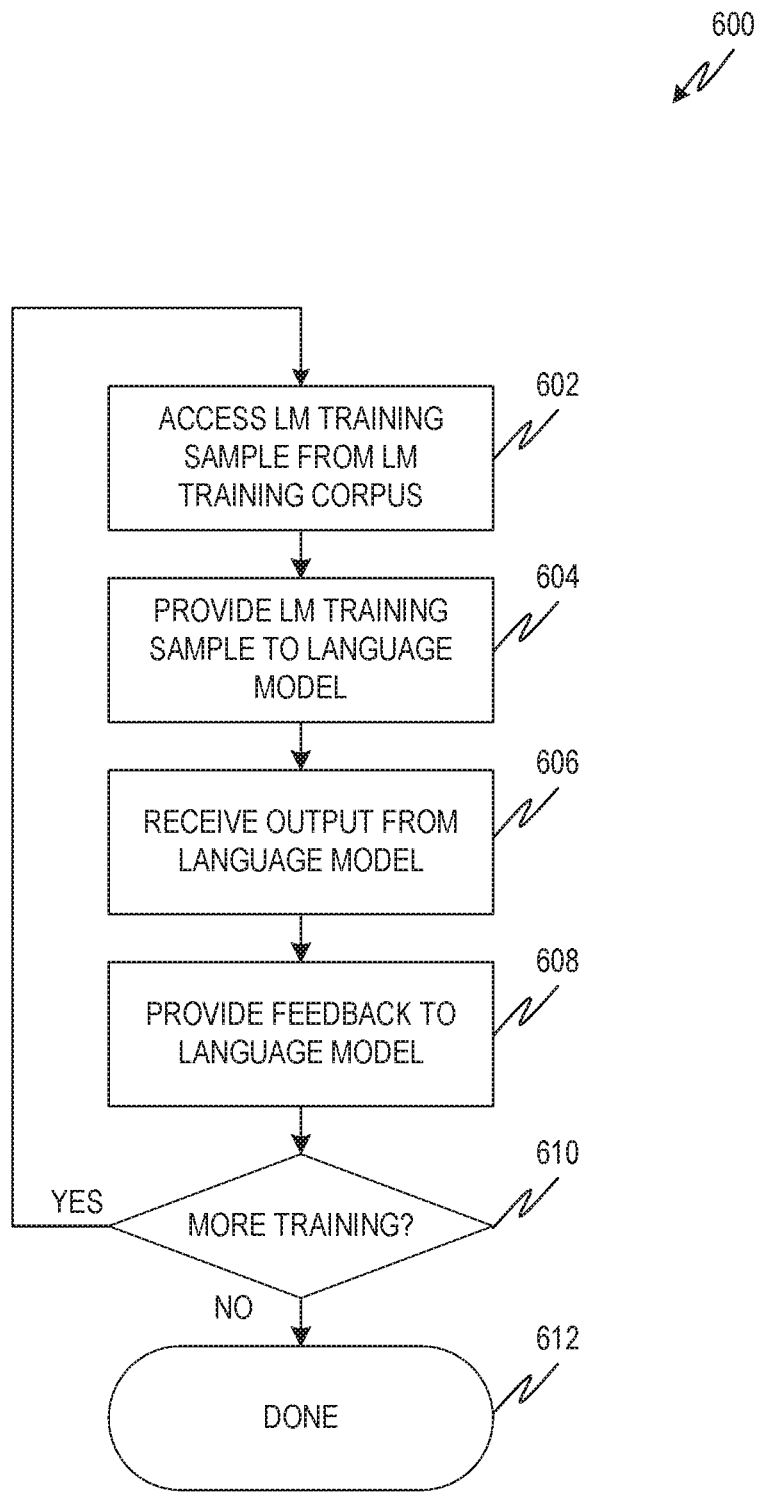
FIG. 6 is a flowchart showing one example of a process flow that can be executed by a computing device to train a language model.

FIG. 6 is a flowchart showing one example of a process flow 600 that can be executed by a computing device, such as the computing device 102 of FIG. 1, to train a language model. The process flow 600 may be used to train any of the language models 106A, 106B, 106N. At operation 602, the computing device accesses a language model training sample from a language model training corpus. The language model training corpus, in some examples, is unlabeled. For example, the samples of the language model training corpus and/or the words thereof may not be associated with metadata describing those samples and/or words. In some examples, the computing device generates the language model training sample. For example, the computing device may select the next n units (e.g., characters, sub-words, words) from the language model training corpus, where the next n units make up the language model training sample. In some examples, training samples are stored at tables of the database 103 and accessed therefrom.

At operation 604, the computing device provides the training sample to the language model. The language model processes the training sample to generate a modeled next unit after the training sample. The modeled next unit can be a next word, a next character, a next sub-word, etc., depending on the level of the language model being trained. At operation 606, the computing device receives the modeled next unit and compares it to an actual next unit at the training corpus.

At operation 608, the computing device provides feedback to the language model based on the comparison of the modeled next unit to the actual next unit. In some examples, the feedback includes modifications to the language model. For example, the computing device may modify one or more layers or nodes at the language model. At operation 610, the computing device determines if more training is to be performed. Additional training may be performed, for example, if the language model has an error rate that is greater than a threshold. If there is no additional training to be performed, the process may be completed at operation 612. If more training is to be performed, the training service accesses a next language model training sample at operation 602 and proceeds to utilize the next language model training sample as described herein.

Figure 7:
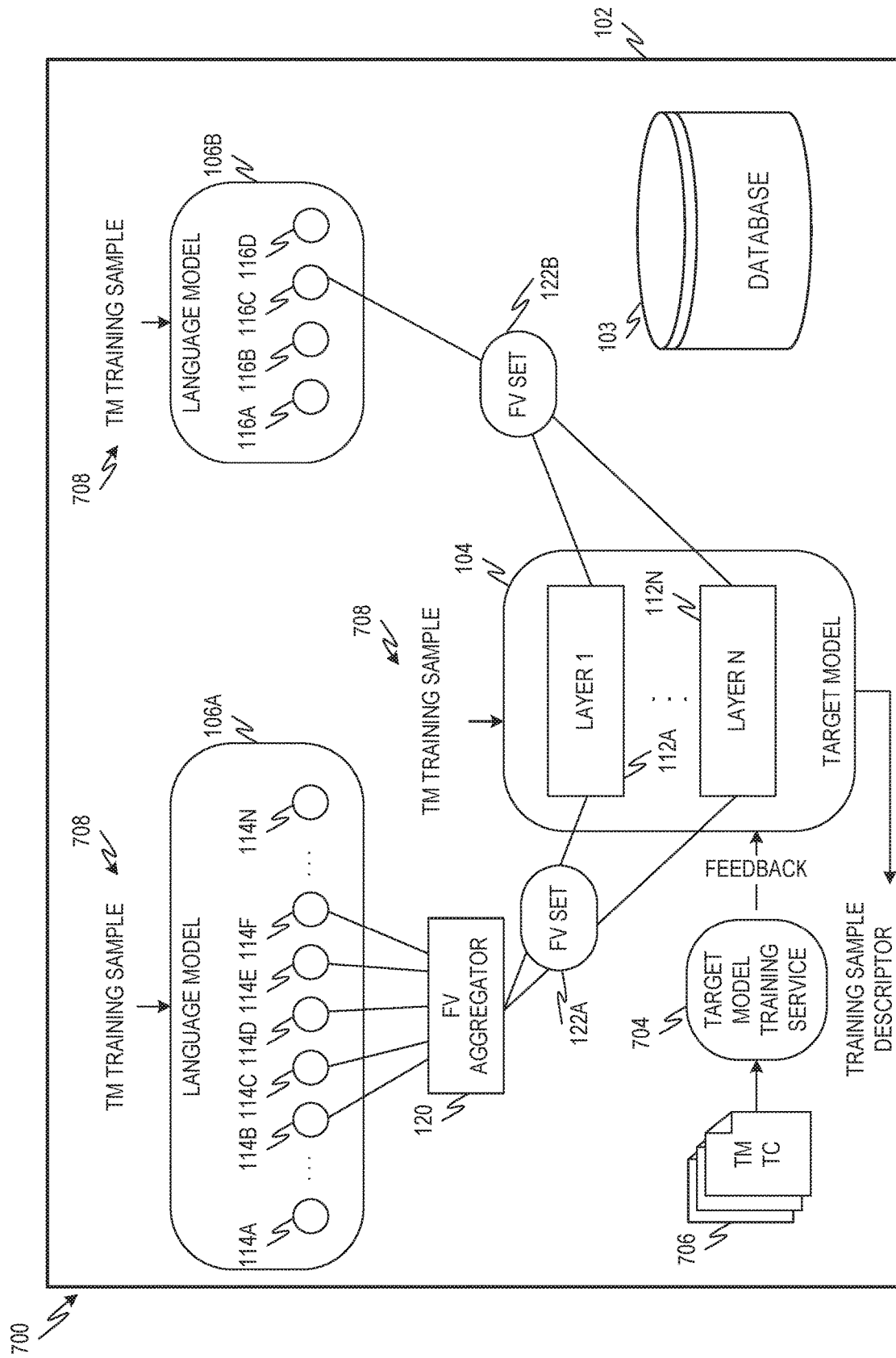
FIG. 7 is a diagram showing one example of an environment for training the target model of FIG. 1.

FIG. 7 is a diagram showing one example of an environment 700 for training the target model 104 of FIG. 1. In the environment 700, the computing device 102 executes the model arrangement of FIG. 1 including, a character level language model 106A and a word level language model 106B. A target model training service 704 trains the target model, for example, using a training corpus 706.

Figure 8:
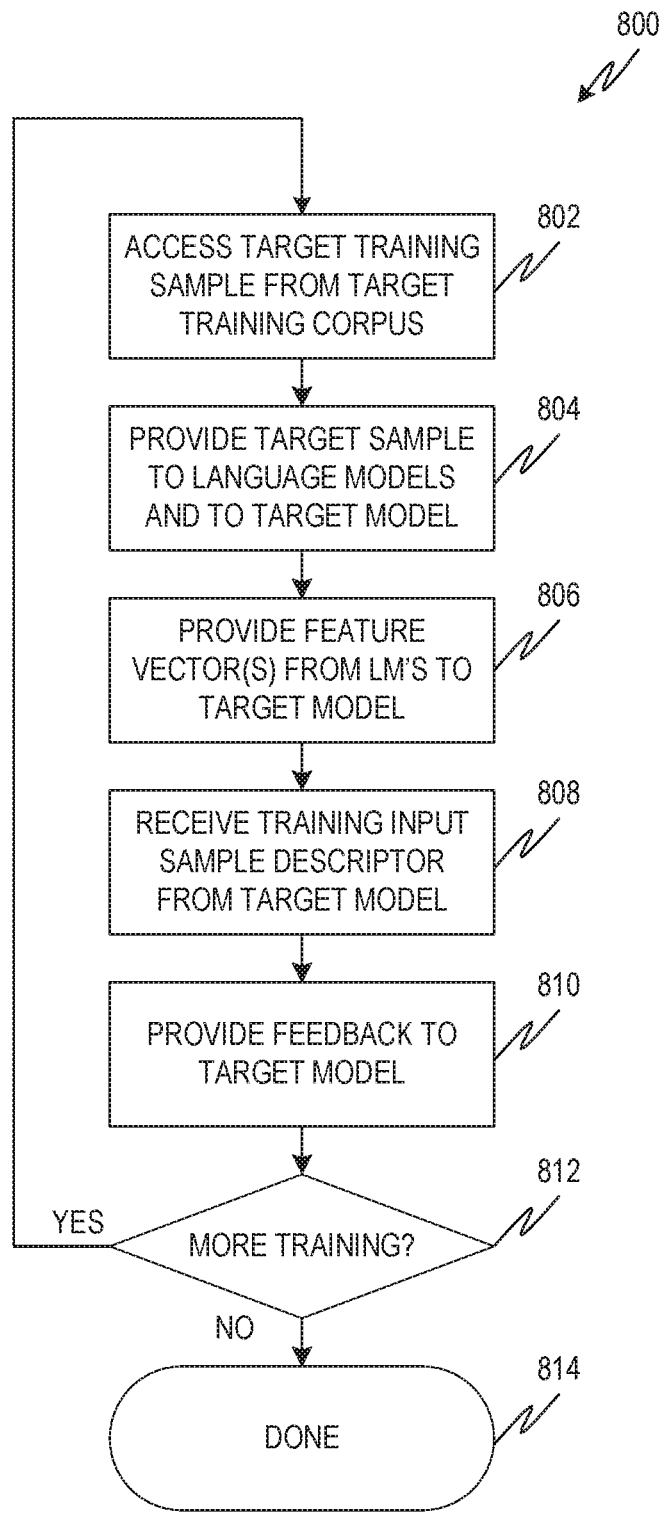
FIG. 8 is a flowchart showing one example of a process flow that can be executed by a computing device to train a target model.

The target model training service 704 is configured to train the target model 104 in any suitable manner, for example, based on the natural language processing task to be performed by the target model 104. FIG. 8 is a flowchart showing one example of a process flow 800 that can be executed by the computing device 102 (e.g., the target model training service 704 thereof) to train the target model 104. Although the process flow 800 is described with respect to FIG. 7, the process flow 800 may also be used to train target models as described with respect to any of the arrangements herein.

At operation 802, the target model training service 704 accesses a target model training sample from a target model training corpus 706. The target model training corpus 706, in some examples, includes labeled training samples. For example, a labeled training sample includes or is associated with a label indicating a training descriptor for the training sample. The training descriptor describes the correct result of the relevant natural language processing task for which the target model 104 is being trained. For example, when the target model 104 is being trained to perform key-value extracting, some or all of the training samples of the target model training corpus 706 are associated with labels indicating a key, if any, for the various strings of the training samples. In examples in which target model 104 is being trained to perform summarization, training samples may be associated with labels that indicate summaries of the respective training samples. In examples in which the target model 104 is being trained to perform sentiment analysis, the training samples may be associated with labels that indicate a sentiment association with one or more of the strings in the training sample and/or the training sample as a whole.

At operation 804, the target model training service 704 provides the target model training sample to the language models 106A, 106B. If additional language models are present, such as the language model 106C, these language models may also be provided with the target model training circuit. At operation 806, the feature vectors sets 122A, 122B are provided to the layers 112A, 112N of the target model 104, for example, as described herein.

At operation 808, the target model training service 704 receives a training sample descriptor from the target model 104. The training sample descriptor is an output of the desired natural language processing task as performed on the target model training sample. For example, when the natural language processing task is key value extraction, the training sample descriptor can be a set of one or more keys describing the strings of the target model training sample. In other examples using the target model 104 to perform other natural language processing tasks, the training sample descriptor can have other values and/or forms as described herein.

At operation 810, the target model training service 704 provides feedback to the target model 104 based on the comparison of the training sample descriptor and the label associated with the target model training sample. In some examples, the feedback includes modifications to the target model 104. For example, the training service 704 may modify a characteristic of one or more of the nodes of the layers 112A, 112N of the target model. Example node characteristics that can be modified include, for example, the weights applied to the respective feature vectors. The training service 704 may utilize a suitable back-propagation technique to translate a delta between the training sample descriptor and the target model training sample label into specific modifications to the nodes.

At operation 812, the target model training service 704 determines if more training is to be performed. Additional training may be performed, for example, if the target model 104 has an error rate that is greater than a threshold. If there is no additional training to be performed, the process may be completed at operation 814. If more training is to be performed, the training service accesses a next target model training sample at operation 802 and proceeds to utilize the next target model training sample as described herein.

EXAMPLES

Example 1 is a computerized system for classifying text, comprising: a database; and at least one processor programmed to perform operations comprising: accessing, from the database, an input sample comprising a first set of ordered words; generating a first language model feature vector for the input sample using a word level language model; generating a second language model feature vector for the input sample using a partial word level language model; generating a descriptor of the input sample using a target model, the input sample, the first language model feature vector, and the second language model feature vector; and writing the descriptor of the input sample to the database.

In Example 2, the subject matter of Example 1 optionally includes wherein the target model is a partial word level model, and wherein the descriptor of the input sample describes a first partial word of the input sample.

In Example 3, the subject matter of Example 2 optionally includes wherein generating the first language model feature vector comprises generating a first word level feature vector using the word level language model and a first word of the input sample, the first word including the first partial word.

In Example 4, the subject matter of Example 3 optionally includes wherein the first language model feature vector comprises the first word level feature vector.

In Example 5, the subject matter of any one or more of Examples 3-4 optionally include wherein generating the first language model feature vector comprises: generating a first word level feature vector using the first word; and determining the first language model feature vector based at least in part on the first word level feature vector.

In Example 6, the subject matter of any one or more of Examples 1-5 optionally include wherein the target model is a word level model and wherein the descriptor of the input sample describes a first word of the input sample.

In Example 7, the subject matter of Example 6 optionally includes the operations further comprising generating a first partial word feature vector using the partial word level language model and a first partial word, wherein the first word comprises the first partial word.

In Example 8, the subject matter of Example 7 optionally includes wherein the partial word level language model is a forward model, wherein the first partial word is an initial partial word of the first word, the operations further comprising selecting the first partial word feature vector as the second language model feature vector.

In Example 9, the subject matter of any one or more of Examples 7-8 optionally include the operations further comprising: generating a second partial word feature vector using the partial word level language model and a second partial word feature vector, wherein the first word comprises the second partial word feature vector; and generating the second language model feature vector using the first partial word feature vector and the second partial word feature vector.

In Example 10, the subject matter of Example 9 optionally includes the operations further comprising executing an attention mechanism to select either the first partial word or the second partial word feature vector as the second language model feature vector.

In Example 11, the subject matter of any one or more of Examples 1-10 optionally include wherein the partial word level language model is a sub-word level model and the operations further comprising generating a third language model feature vector for the input sample using a character level model, wherein the generating of the descriptor of the input sample is also based on the third language model feature vector.

In Example 12, the subject matter of any one or more of Examples 1-11 optionally include the operations further comprising: generating a partial word level language model forward feature vector using a first partial word of the input sample, a forward layer of the partial word level language model, and at least one partial word of the input sample prior to the first partial word; and generating a partial word level language model reverse feature vector using the first partial word of the input sample, a backwards layer of the partial word level language model, and at least one partial word of the input sample after the first partial word.

In Example 13, the subject matter of Example 12 optionally includes wherein the target model is a word level model, and wherein the descriptor of the input sample describes a first word of the input sample.

Example 14 is a method for classifying text, the method comprising: accessing, by a computing device and from a database, an input sample comprising a first set of ordered words; generating, by the computing device, a first language model feature vector for the input sample using a word level language model; generating, by the computing device, a second language model feature vector for the input sample using a partial word level language model; generating, by the computing device, a descriptor of the input sample using a target model, the input sample, the first language model feature vector, and the second language model feature vector; and writing the descriptor of the input sample to the database.

In Example 15, the subject matter of Example 14 optionally includes wherein the target model is a partial word level language model, and wherein the descriptor of the input sample describes a first partial word of the input sample.

In Example 16, the subject matter of Example 15 optionally includes wherein generating the first language model feature vector comprises generating a first word level feature vector using the word level language model and a first word of the input sample, the first word including the first partial word.

In Example 17, the subject matter of Example 16 optionally includes wherein the first language model feature vector comprises the first word level feature vector.

In Example 18, the subject matter of any one or more of Examples 16-17 optionally include wherein generating the first language model feature vector comprises: generating a first word level feature vector using the first word; and determining the first language model feature vector based at least in part on the first word level feature vector.

In Example 19, the subject matter of any one or more of Examples 14-18 optionally include wherein the target model is a word level model and wherein the descriptor of the input sample describes a first word of the input sample.

Example 20 is a non-transitory machine-readable medium comprising instructions thereon that, when executed by at least one processor, cause the at least one processor to perform operations comprising: accessing, from a database, an input sample comprising a first set of ordered words; generating a first language model feature vector for the input sample using a word level language model; generating a second language model feature vector for the input sample using a partial word level language model; generating a descriptor of the input sample using a target model, the input sample, the first language model feature vector, and the second language model feature vector; and writing the descriptor of the input sample to the database.

Figure 9:
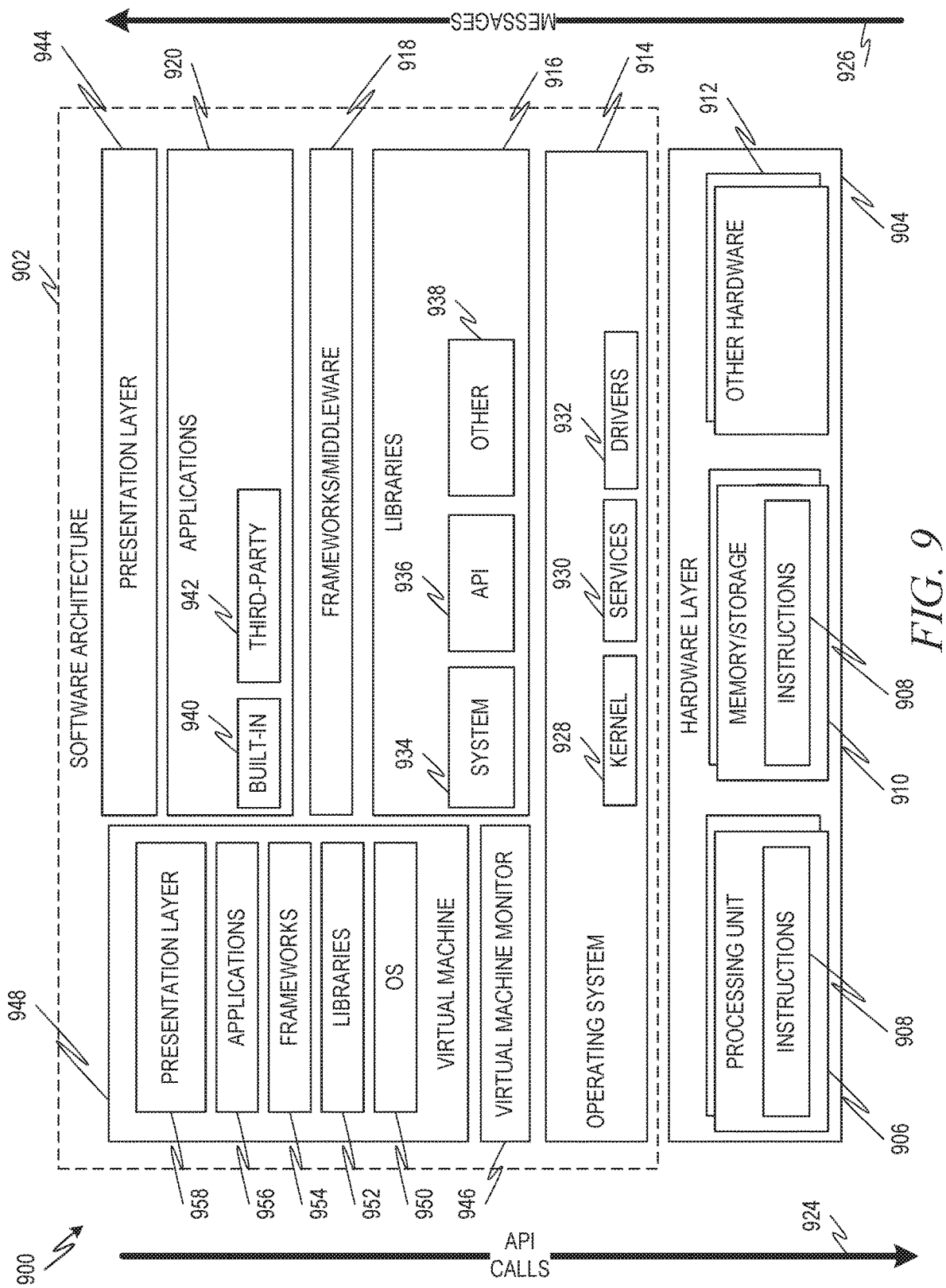
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system 1000 of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912, which represents any other hardware of the hardware layer 904, such as the other hardware illustrated as part of computer system 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers, in some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 14D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules. In some examples, libraries 916 may provide one or more APIs serviced by a message-oriented middleware.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine 948 is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitory configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
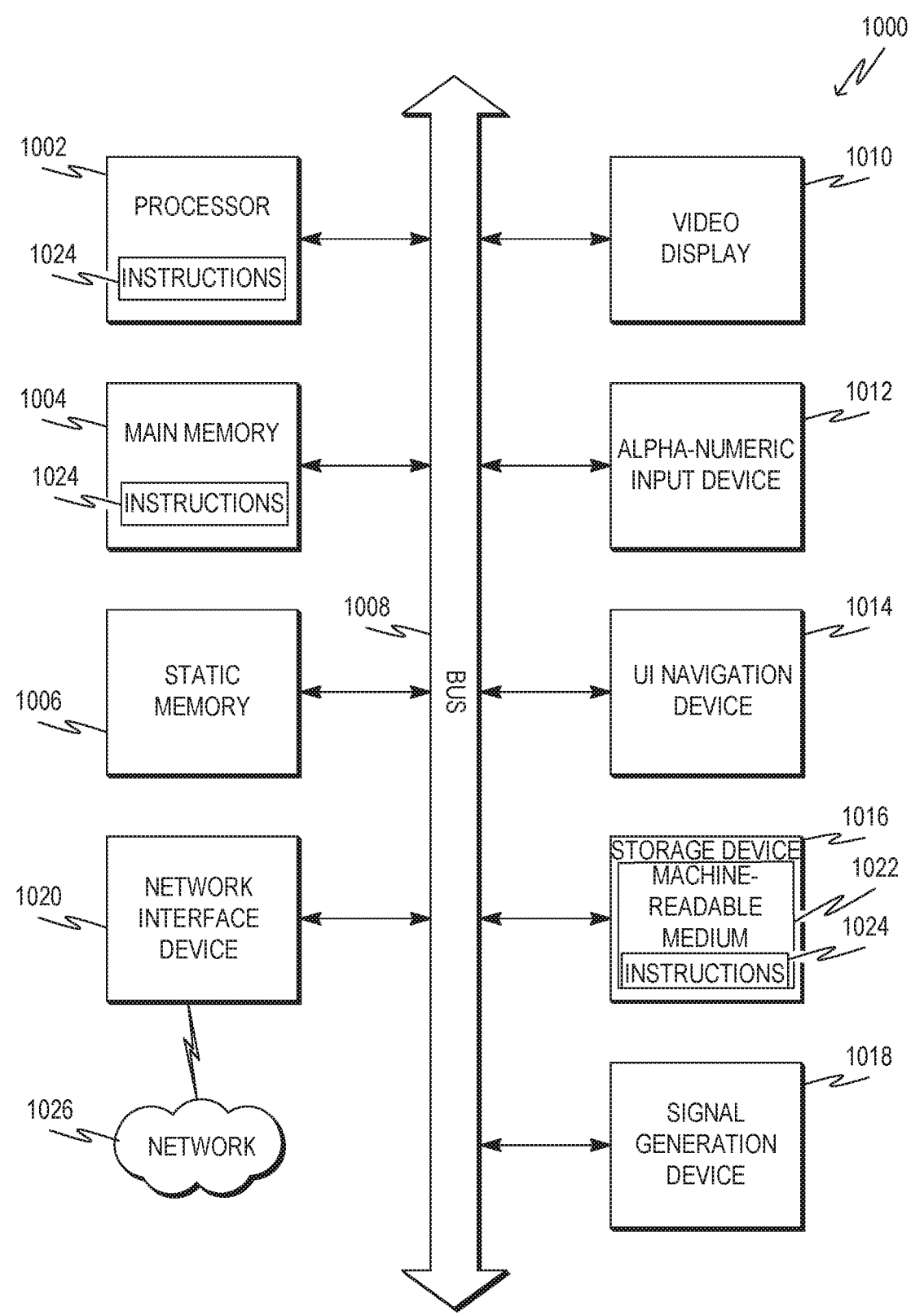
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive device 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computerized system for classifying text, comprising:
   a database; and
   at least one processor programmed to perform operations comprising:
      accessing, from the database, an input sample comprising a first set of ordered words;
      generating a first language model feature vector for the input sample using a word level language model;
      generating a second language model feature vector for the input sample using a partial word level language model;
      generating a descriptor of the input sample using a target model, the input sample, the first language model feature vector, and the second language model feature vector; and
      writing the descriptor of the input sample to the database.

2. The computerized system of claim 1, wherein the target model is a partial word level model, and wherein the descriptor of the input sample describes a first partial word of the input sample.

3. The computerized system of claim 2, wherein generating the first language model feature vector comprises generating a first word level feature vector using the word level language model and a first word of the input sample, the first word including the first partial word.

4. The computerized system of claim 3, wherein the first language model feature vector comprises the first word level feature vector.

5. The computerized system of claim 3, wherein generating the first language model feature vector comprises:
   generating a first word level feature vector using the first word; and
   determining the first language model feature vector based at least in part on the first word level feature vector.

6. The computerized system of claim 1, wherein the target model is a word level model and wherein the descriptor of the input sample describes a first word of the input sample.

7. The computerized system of claim 6, the operations further comprising generating a first partial word feature vector using the partial word level language model and a first partial word, wherein the first word comprises the first partial word.

8. The computerized system of claim 7, wherein the partial word level language model is a forward model, wherein the first partial word is an initial partial word of the first word, the operations further comprising selecting the first partial word feature vector as the second language model feature vector.

9. The computerized system of claim 7, the operations further comprising:
generating a second partial word feature vector using the partial word level language model and a second partial word feature vector, wherein the first word comprises the second partial word feature vector; and
generating the second language model feature vector using the first partial word feature vector and the second partial word feature vector.

10. The computerized system of claim 9, the operations further comprising executing an attention mechanism to select either the first partial word or the second partial word feature vector as the second language model feature vector.

11. The computerized system of claim 1, wherein the partial word level language model is a sub-word level model and the operations further comprising generating a third language model feature vector for the input sample using a character level model, wherein the generating of the descriptor of the input sample is also based on the third language model feature vector.

12. The computerized system of claim 1, the operations further comprising:
generating a partial word level language model forward feature vector using a first partial word of the input sample, a forward layer of the partial word level language model, and at least one partial word of the input sample prior to the first partial word; and
generating a partial word level language model reverse feature vector using the first partial word of the input sample, a backwards layer of the partial word level language model, and at least one partial word of the input sample after the first partial word.

13. The computerized system of claim 12, wherein the target model is a word level model, and wherein the descriptor of the input sample describes a first word of the input sample.

14. A method for classifying text, the method comprising:
accessing, by a computing device and from a database, an input sample comprising a first set of ordered words;
generating, by the computing device, a first language model feature vector for the input sample using a word level language model;
generating, by the computing device, a second language model feature vector for the input sample using a partial word level language model;
generating, by the computing device, a descriptor of the input sample using a target model, the input sample, the first language model feature vector, and the second language model feature vector; and
writing the descriptor of the input sample to the database.

15. The method of claim 14, wherein the target model is a partial word level language model, and wherein the descriptor of the input sample describes a first partial word of the input sample.

16. The method of claim 15, wherein generating the first language model feature vector comprises generating a first word level feature vector using the word level language model and a first word of the input sample, the first word including the first partial word.

17. The method of claim 16, wherein the first language model feature vector comprises the first word level feature vector.

18. The method of claim 16, wherein generating the first language model feature vector comprises:
generating a first word level feature vector using the first word; and
determining the first language model feature vector based at least in part on the first word level feature vector.

19. The method of claim 14, wherein the target model is a word level model and wherein the descriptor of the input sample describes a first word of the input sample.

20. A non-transitory machine-readable medium comprising instructions thereon that, when executed by at least one processor, cause the at least one processor to perform operations comprising:
accessing, from a database, an input sample comprising a first set of ordered words;
generating a first language model feature vector for the input sample using a word level language model;
generating a second language model feature vector for the input sample using a partial word level language model;
generating a descriptor of the input sample using a target model, the input sample, the first language model feature vector, and the second language model feature vector; and
writing the descriptor of the input sample to the database.

* * * * *